United States Patent Office 2,767,197
Patented Oct. 16, 1956

2,767,197

PRODUCTION OF DIBENZANTHRONYLS AND DERIVATIVES THEREOF

Tellis A. Martin, Evansville, Ind., David I. Randall, Easton, Pa., and John Taras, Alpha, N. J., assignors to General Aniline & Film Corporation, New York, N. Y., a corporation of Delaware No Drawing. Application December 30, 1953,
Serial No. 401,367

14 Claims. (Cl. 260—353)

This invention relates to improvements in the production of Bz-1:Bz-1'-dibenzanthronyls and derivatives thereof from benzanthrone.

Several general methods have been described for the preparation of Bz-1:Bz-1'-dibenzanthronyl, the most common method involving conversion of benzanthrone in concentrated sulfuric acid by means of an oxidizing agent such as manganese dioxide, chromic acid or anhydride, manganic sulfate, or the like. All of these methods employing sulfuric acid and an oxidizing agent have never been found completely satisfactory due to variously low yields, production of oxo derivatives of the benzanthrone and dibenzanthronyl, high cost, etc.

Several expedients have been devised in an attempt to overcome these deficiencies. Thus, U. S. Patent No. 2,001,063 describes a process for converting benzanthrone with sulfuric acid and an oxidizing agent in which the condensation is carried out under mild conditions, e. g., lower concentraton of sulfuric acid and/or shortened reaction time in such a manner as to leave from 30 to 40 percent of the benzanthrone unchanged in the reaction mass. This process, however, requires the recovery of benzanthrone if comparatively high yields of the Bz-1:Bz-1'-dibenzanthronyls are to be obtained. Another such expedient is disclosed in U. S. Patent No. 2,413,507 in which methyl sulfuric acid or ethyl sulfuric acid is substituted for the sulfuric acid employed in the prior art. This process likewise fails to give yields substantially in excess of 70 percent and is costly in requiring the preliminary manufacture of the alkyl sulfuric acid by reaction between chlorosulfonic acid and the appropriate alcohol followed by removal of excess alcohol, which latter would otherwise interfere with the reaction.

It is an object of this invention to provide an improved process for the preparation of Bz-1:Bz-1'-dibenzanthronyl and its simple monovalent substitution derivatives, whereby higher yields of the Bz-1:Bz-1'-dibenzanthronyl are obtained substantially free from oxy bodies and unchanged benzanthrone in the reaction mass.

It is a further object of this invention to provide an improved process for the preparation of improved dyestuffs such as dibenzanthrones from Bz-1:Bz-1'-dibenzanthronyls. A further object of this invention is the production of improved dibenzanthrones such as nitro and amino-dibenzanthrones from Bz-1:Bz-1'-dibenzanthronyls. Other objects and advantages will appear as the description proceeds.

The attainment of the above objects is made possible by the instant invention which involves the use, in a process for preparing Bz-1:Bz-1'-dibenzanthronyl and its halogen and lower alkyl derivatives wherein condensation of the benzanthrone compound is effected by means of an oxidizing agent, of a mixture of concentrated sulfuric acid and a nitrobenzene as the solvent or reaction medium. It has been found that when a mixture of concentrated sulfuric acid and a nitrobenzene is employed in place of sulfuric acid or alkyl sulfuric acid as the reaction solvent in processes of the type aforementioned, much higher yields of the Bz-1:Bz-1'-dibenzanthronyl of higher purity are obtained than has been previously possible without reworking the reaction product to remove unchanged benzanthrone and over-oxidized material. Yields of the order of about 75 to 95 percent are thereby obtained, and purification by acid recrystallization as well as alkali extraction to remove oxy bodies are no longer necessary.

In the novel reaction medium employed in the process of this invention, the sulfuric acid should generally have a concentration of at least about 90 percent by weight since at lower concentrations, the water causes thickening of the reaction mixture, difficulty in agitation, and a lowering of the quality of the product. It will be understood that the term "concentrated sulfuric acid" includes concentrations of at least 90 percent by weight up to 65 percent oleum. The sulfuric acid in the reaction medium may be employed in proportions of as little as 2 to 6 parts by weight per part of benzanthrone to be oxidized although larger proportions may be employed if desired, in which case the process would generally be thereby rendered less economical.

As the nitrobenzene to be employed in the reaction medium in accordance with this invention, nitrobenzene itself is preferred. However, lower alkyl substituted nitrobenzenes may be employed in which the nitrobenzene is substituted by an alkyl radical such as methyl, ethyl, propyl or butyl, or the like. The nitrobenzene may be employed in proportions of from about 2 to 30 parts and preferably 2 to 10 parts by weight per part of benzanthrone to be oxidized although larger proportions may be employed if desired. As above stated, nitrobenzene per se is preferred because of its ease of recovery by steam distillation or the like, its low cost, and the high quality and yield of the desired product Bz-1:Bz-1'-dibenzanthronyl which its use enables. In any particular instance, the weight ratio of sulfuric acid to nitrobenzene may vary from about 1:1 to 1:5, depending on the reaction temperature and duration, concentration of acid and the like.

The oxidizing agents which may be employed in the process for converting the benzanthrone are those which have been previously employed with sulfuric acid such as manganese dioxide, alkali chromates, chromic acid anhydride, manganic sulfate and the like. Manganese dioxide is preferred. The amount of oxidizing agent to be used will vary depending upon the concentration of the solvent, the ratio of sulfuric acid and nitrobenzene, the temperature employed, and the like. In general, it has been found that 1 to 8 moles of manganese dioxide or an equivalent amount of other oxidizing agent per mole of benzanthrone will give the desired results.

The oxidation process may be carried out at temperatures of from −10° C. or lower to 55° C. or higher and for a sufficient period of time to allow completion of the conversion. Instead of benzanthrone itself, other substituted benzanthrones, which do not contain a halogen or alkyl group in the 2- or Bz-1 positions, such as 6-methyl-, 6-ethyl-, 6-chloro-, 7-ethyl-, 7-chloro-benzanthrones and the like, may be employed as the starting compound to produce the corresponding substituted Bz-1:Bz-1'-dibenzanthronyls. The Bz-1:Bz-1'-dibenzanthronyl product may be isolated in excellent yield and purity by merely pouring the reaction mixture into water after completion of the reaction, filtering, and removing traces of the nitrobenzene from the filter cake by subjecting it to a steam distillation. The crude product is then heated in known manner with dilute sulfuric acid and sodium bisulfite to remove the manganese dioxide, and the product collected on a filter, washed and dried.

The Bz-1:Bz-1'-dibenzanthronyls produced by the above described process of this invention may be employed for the manufacture of improved intermediates and dyestuffs, as for example by fusion in caustic alkali to the corresponding dibenzanthrone and the like. The resulting products possess improved properties attributable to the higher purity of the Bz-1:Bz-1'-dibenzanthronyls employed. The Bz-1:Bz-1'-dibenz-anthronyl products of the above described process of this invention may alternatively be mono- or poly-nitrated by treatment with mixed nitration acid (nitric acid and sulfuric acid) and the nitrated dibenzanthronyl fused with caustic alkali, if desired with simultaneous or preliminary reduction as disclosed in U. S. Patent Nos. 1,859,212, 1,957,459, 2,310,087 and 2,374,328 to produce the corresponding mono- or poly-amino dibenzanthrones.

As a further feature of this invention, it has been found that the reaction mixture containing the Bz-1:Bz-1'-dibenzanthronyl in sulfuric acid-nitrobenzene media produced in the above described process of this invention is peculiarly adapted for direct nitration of the dibenzanthronyl without isolation. This may be accomplished by simple addition of nitric acid or a mixed sulfuric-nitric nitration acid in the required amounts to the said reaction mixture. Not only is this process of nitration economical in avoiding the isolation step which would otherwise be required, but the nitrated dibenzanthronyl after reduction and fusion, displays improved and unexpected properties not possessed by the prior art products in which nitration is conducted in either sulfuric acid or organic solvents such as nitrobenzene. These improved properties are evidenced by improvements in fastness to chlorine and the like, indicating that the different nitration media apparently results in changing the orientation of the incoming nitro groups whereby the resulting products are isomers different from those of the prior art.

The above described nitration process may be carried out by addition of nitric acid or mixed nitration acid (nitric acid and sulfuric acid) to the sulfuric acid-nitrobenzene reaction mixture of Bz-1:Bz-1'-dibenzanthronyl obtained in the above described process.

The weight ratio of nitric acid to sulfuric acid may range from about 1:9 to 9:1, the amount of nitric acid employed in any particular instance depending on the amount of sulfuric acid already present in the reaction mixture and the extent of nitration desired in the nitrated dibenzanthronyl product. Thus, if a mononitro product is desired, at least one mole of nitric acid (10% excess is usually preferred) should be used for each mole of dibenzanthronyl (or about 2 moles of benzanthrone). Similarly, two, three or more moles of nitric acid are required to produce the di-, tri-, and more highly nitrated products. Up to 10% water by weight of the sulfuric acid may be present in the reaction mixture without appreciably reducing the nitrating activity of the mixed acid, 95% nitric acid (sp. gr. 1.51) and 100% sulfuric acid (sp. gr. 1.83) being preferred. Since 100% sulfuric acid is already present in the mixture, only 90–100% nitric acid could be added if desired, or down to about a 10% nitric acid, 90% sulfuric acid mixture. A mixed acid containing nitric and sulfuric in a ratio of 1:3 is preferred. It will accordingly be understood that the nitration reaction conditions and proportions of components will be determined by the results desired. The temperatures at which the nitration is carried out may vary from —10° C. to 25° C. or higher, the only limitation being that the temperatures should not be allowed to rise so high as to cause excessive oxidation.

When the nitration reaction has been completed, the nitrated dibenzanthronyl may be isolated in excellent yield by pouring the reaction mixture into water, decanting or syphoning off the aqueous layer, removing the nitrobenzene layer by steam or the like, and then treating with sodium bisulfite to remove excess manganese dioxide or other oxidizing agent followed by filtering, washing and drying. Alternatively the excess manganese dioxide may be removed by treating the aqueous drowned reaction mass with sodium bisulfite before or during removal of the nitrobenzene.

The isolated nitrated dibenzanthronyl may then be subjected to reduction and fusion in caustic alkali in known manner as disclosed in the aforementioned patents. Alternatively, the nitrated dibenzanthronyl may be subjected to reduction and condensation without isolation from the nitration mixture in which it is produced, as described in U. S. Patent No. 2,310,087. Likewise, condensation and reduction may be carried out simultaneously in the caustic fusion step. The resulting amino dibenzanthrones yield on cotton and rayon, grey to black shades of very good fastness to light, chlorine and washing.

The following examples, in which parts are by weight unless otherwise indicated are illustrative of the instant invention and are not to be regarded as limitative.

*Example 1*

100 parts of benzanthrone were added in batches at 25–30° C. to a mechanically stirred solution of 550 parts of 100% sulfuric acid and 960 parts of nitrobenzene. After stirring for two hours or until complete solution had resulted, the reaction mixture was cooled to —5° C. Then at —5 to 0° C. 65 parts of manganese dioxide (87½%) were added in small portions over a period of one hour. The reaction mixture was stirred at this temperature for two to three hours, at 0 to 5° C. for twenty hours and then poured into 8000 parts of water. The precipitated crude Bz-1:Bz-1'-dibenzanthronyl containing small amounts of excess manganese dioxide, was collected on a filter and the filter cake was subjected to a steam distillation to remove traces of nitrobenzene. As the resulting crude product was stirred with 600 parts of water containing 100 parts of dissolved sodium bisulfite, 184 parts of concentrated sulfuric acid was added slowly. Then the mixture was heated at the boil for two hours by blowing in steam. The solid material was collected on a filter, washed and dried, yielding 75 parts (75%) of Bz-1:Bz-1'-dibenzanthronyl. This material was shown to be of good quality (free from unchanged benzanthrone and oxy bodies) by its absorption spectrum and by conversion into dibenzanthrone by caustic fusion.

*Example 2*

The procedure of Example 1 was repeated except that a larger quantity (100 parts) of manganese dioxide was used. The yield was 87 parts (87%) of material of excellent quality. Its ultraviolet absorption curve was found to be a good match to the purified Bz-1:Bz-1'-dibenzanthronyl prepared according to prior art methods.

*Example 3*

The procedure of Example 1 was repeated except that 75 parts of manganese dioxide were employed in place of the 65 parts employed in Example 1. The yield was 78 parts (78%) of material equal in quality to that obtained in Example 1.

*Example 4*

200 parts of benzanthrone were added in portions to a mechanically stirred solution of 734 parts of 100% sulfuric acid and 772 parts of nitrobenzene. After stirring for two hours the reaction mixture was cooled to 5° C. and 100 parts of manganese dioxide were introduced in small portions at 5–10° C. When the addition was complete (2–3 hours), the reaction mixture was stirred at 5–10° C. for four hours and at room temperature for two days. The product was isolated as described above, yielding 154 parts (78%) of Bz-1:Bz-1'-dibenzanthronyl of good quality, free from unchanged benzanthrone and oxy bodies.

Example 5

The procedure of Example 1 was repeated up to pouring the reaction mixture into water. After the reaction mixture had been poured into 8000 parts of water, the aqueous mass was heated to 95–110° by steam and excess manganese dioxide removed by addition of sodium bisulfite. The nitrobenzene layer was separated, then steam distilled to remove nitrobenzene. The yield was 106 g. of Bz-1:Bz-1′-dibenzanthronyl product. Ultraviolet absorption curve showed this product to be only slightly impure and from comparison with the curve of a pure sample, the actual yield was calculated to be approximately 91%. This product was found to yield Violanthrone in excellent yield and to serve as starting material for other important dyestuffs of the Violanthrone family.

Example 6

To a solution of 368 parts of 100% sulfuric acid and 480 parts of o-nitrotoluene were added slowly, at 20–25° C., 100 parts of benzanthrone. After stirring at room temperature for two hours or until solution results, 60 parts of manganese dioxide were gradually added at 0–5° C. for ten hours and at room temperature for eight hours, then poured into 4000 parts of water. After standing overnight, the solid material was collected on a filter, washed with ethanol and water. The wet filter cake was heated at the boil for four hours with a mixture of 3000 parts of water, 100 parts of sodium bisulfite and 184 parts of 96% sulfuric acid. Then the solid was collected on a filter, washed and dried, yielding a Bz-1:Bz-1′-dibenzanthronyl product of average quality as determined by its absorption spectrum.

Example 7

200 parts of benzanthrone were added in increments (at 20–25° C. during two hours) to a mixture of 772 parts of nitrobenzene and 736 parts of concentrated sulfuric acid (96%). After stirring for two hours the mixture was cooled at 5° C. and 130 parts of manganese dioxide were added slowly at 5 to 10° C. After stirring at 5 to 10° C. for six hours and at room temperature for fifteen hours, the material was isolated as above, yielding 155 g. of Bz-1:Bz-1′-dibenzanthronyl product of good quality.

Example 8

Except for the use of a different reaction solvent (a mixture of 772 parts of nitrobenzene, 550 parts of 100% sulfuric acid and 200 parts of 20% oleum), the procedure was identical to Example 7. 170 g. of Bz-1:Bz-1′-dibenzanthronyl product of fair quality were obtained.

Example 9

100 parts of benzanthrone were added in batches at 25 to 30° C. to a mechanically stirred solution of 550 parts of 100% sulfuric acid and 960 parts of nitrobenzene. After stirring for two hours or until complete solution had resulted, the reaction mixture was cooled to 0° C. and at 0 to 5° C., 100 parts of manganese dioxide were added slowly over a period of 1 to 2 hours. The reaction mixture was stirred at 0 to 5° C. for an additional period of twenty hours. Then 125 parts of mixed nitration acid (⅓ HNO₃ and ⅔ H₂SO₄ by weight) were added dropwise at 0 to 5° C. The reaction mixture was stirred at this temperature for twenty-four hours. The crude dinitro derivative was isolated by pouring with stirring the reaction mixture onto 4000 parts of icewater, decanting most of the aqueous layer, removing the nitrobenzene layer by a steam distillation, removing the excess manganese dioxide by heating with 100 parts of sodium bisulfite and 200 parts of concentrated sulfuric acid, filtering, washing and drying. The yield was 132 g. of dinitro Bz-1:Bz-1′-dibenzanthronyl.

*Anal.*—Calc. for the dinitro derivative ($C_{34}H_{16}N_2O_6$): N, 5.10. Found: N, 4.95.

50 parts of the above material were ball-milled with 277 parts of methanol for six hours. (Instead of ballmilling, the material may be hammermilled or kept wet with methanol to obtain the desirable results.) This paste was added slowly at 80° to 90° C. to a melt of 500 parts of potassium hydroxide and 47.5 parts of methanol. The resulting melt was stirred at this temperature for 10–20 minutes and heated slowly (2 hours) to 120° C., distilling off methanol. After heating under reflux at 120–125° C. the reaction mass was drowned in water, aerated, filtered and converted to a paste in usual manner containing 44 g. of diamino dibenzanthrone. This product yielded on cotton and rayon excellent shades of grey to black of excellent fastness to chlorine, light and washing.

Various modifications and variations of this invention will be obvious to persons skilled in the art and such modifications and variations are to be regarded as within the purview of this application and the spirit and scope of the appended claims.

We claim:

1. In the process for preparing a member of the group consisting of Bz-1:Bz-1′-dibenzanthronyl and its halogen and lower alkyl derivatives by condensation of the corresponding benzanthrone compound in the presence of an inorganic oxidizing agent, the step which comprises carrying out said condensation in a mixture of sulfuric acid having a concentration of at least 90 percent by weight and a nitrobenzene.

2. A process as defined in claim 1 wherein the oxidizing agent is manganese dioxide.

3. A process as defined in claim 2 wherein said mixture contains 2 to 6 parts of sulfuric acid and 2 to 10 parts of nitrobenzene for each part of benzanthrone compound to be oxidized.

4. In a process for preparing Bz-1:Bz-1′-dibenzanthronyl by condensation of benzanthrone in the presence of an inorganic oxidizing agent, the step which comprises carrying out said condensation in a mixture of sulfuric acid having a concentration of at least 90 percent by weight and a nitrobenzene.

5. A process as defined in claim 4 wherein the oxidizing agent is manganese dioxide.

6. A process as defined in claim 5 wherein said mixture contains 2 to 6 parts of sulfuric acid and 2 to 10 parts of nitrobenzene for each part of benzanthrone compound to be oxidized.

7. A process comprising condensing a benzanthrone compound in a mixture containing sulfuric acid having a concentration of at least 90 percent by weight, a nitrobenzene, and an inorganic oxidizing agent to produce the corresponding Bz-1:Bz-1′-dibenzanthronyl, and then adding a nitrating acid to the resulting reaction mass to produce the corresponding nitrated Bz-1:Bz-1′-dibenzanthronyl.

8. A process as defined in claim 7 wherein the oxidizing agent is manganese dioxide.

9. A process as defined in claim 8 wherein said mixture contains 2 to 6 parts of sulfuric acid and 2 to 10 parts of nitrobenzene for each part of benzanthrone compound to be oxidized.

10. A process as defined in claim 7 wherein the nitrating acid comprises ⅓ nitric acid and ⅔ sulfuric acid by weight.

11. A process comprising condensing a benzanthrone compound in a mixture containing sulfuric acid having a concentration of at least 90 percent by weight, a nitrobenzene, and an inorganic oxidizing agent to produce the corresponding Bz-1:Bz-1′-dibenzanthronyl, adding nitrating acid to the resulting reaction mass to produce the corresponding nitrated Bz-1:Bz-1′-dibenzanthronyl, and then reducing and condensing the nitrated Bz-1:Bz-1′-dibenzanthronyl to produce the corresponding aminated dibenzanthrone.

12. A process as defined in claim 11 wherein the oxidizing agent is manganese dioxide.

13. A process as defined in claim 12 wherein said mixture contains 2 to 6 parts of sulfuric acid and 2 to 10 parts of nitrobenzene for each part of benzanthrone compound to be oxidized.

14. A process as defined in claim 11 wherein the nitrating acid comprises ⅓ nitric acid and ⅔ sulfuric acid by weight.

References Cited in the file of this patent

UNITED STATES PATENTS

| | | |
|---|---|---|
| 1,957,459 | Howell | May 8, 1934 |
| 2,001,063 | Howell | May 14, 1935 |
| 2,136,998 | Belcher | Nov. 15, 1938 |
| 2,413,507 | Lee et al. | Dec. 31, 1946 |
| 2,637,733 | Straley | May 5, 1953 |

FOREIGN PATENTS

| | | |
|---|---|---|
| 431,774 | Germany | July 6, 1926 |
| 551,622 | Great Britain | Mar. 3, 1943 |